US009734409B2

United States Patent
Katsavounidis

(10) Patent No.: US 9,734,409 B2
(45) Date of Patent: Aug. 15, 2017

(54) DETERMINING NATIVE RESOLUTIONS OF VIDEO SEQUENCES

(71) Applicant: NETFLIX, INC, Los Gatos, CA (US)

(72) Inventor: Ioannis Katsavounidis, Los Angeles, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 14/879,053

(22) Filed: Oct. 8, 2015

(65) Prior Publication Data

US 2016/0381401 A1 Dec. 29, 2016

Related U.S. Application Data

(60) Provisional application No. 62/184,183, filed on Jun. 24, 2015.

(51) Int. Cl.
*G06K 9/40* (2006.01)
*G06K 9/00* (2006.01)
(Continued)

(52) U.S. Cl.
CPC ....... *G06K 9/00765* (2013.01); *G06K 9/4652* (2013.01); *H04N 9/64* (2013.01); *H04N 21/23418* (2013.01); *H04N 21/2662* (2013.01)

(58) Field of Classification Search
CPC ....... G06T 3/4007; G06T 3/4023; G06T 3/40; G06T 3/4053; G06T 5/001; H04N 1/40068; H04N 21/2662; G06K 9/4652
See application file for complete search history.

(56) References Cited

U.S. PATENT DOCUMENTS 5,305,116 A * 4/1994 Kagami ............... G06T 3/40
358/445
5,555,557 A * 9/1996 Mailloux ........... G06K 15/1223
382/298

(Continued)

FOREIGN PATENT DOCUMENTS

JP 2009 044417 A 2/2009

OTHER PUBLICATIONS

International Search Report having Application No. PCT/US2016/029872, dated Jul. 11, 2016, 11 pages.

(Continued)

*Primary Examiner* — Amir Alavi
(74) *Attorney, Agent, or Firm* — Artegis Law Group, LLP

(57) ABSTRACT

In one embodiment of the present invention, a native resolution analyzer generates a log-magnitude spectrum that elucidates sampling operations that have been performed on a scene. In operation, the native resolution analyzer performs a transform operation of a color component associated with a frame included in the scene to generate a frame spectrum. The native resolution analyzer then normalizes the magnitudes associated with the frame spectrum and logarithmically scales the normalized magnitudes to create a log-magnitude frame spectrum. This two dimensional log-magnitude frame spectrum serves as a frequency signature for the frame. More specifically, patterns in the log-magnitude spectrum reflect re-sampling operations, such as a down-sampling and subsequent up-sampling, that may have been performed on the frame. By analyzing the log-magnitude spectrum, discrepancies between the display resolution of the scene and the lowest resolution with which the scene has been processed may be detected in an automated fashion.

20 Claims, 8 Drawing Sheets

(51) Int. Cl.
  *G06K 9/46* (2006.01)
  *H04N 9/64* (2006.01)
  *H04N 21/234* (2011.01)
  *H04N 21/2662* (2011.01)

(56) References Cited

U.S. PATENT DOCUMENTS

| | | | | |
|---|---|---|---|---|
| 5,617,224 A * | 4/1997 | Ichikawa | G06T 3/4023 | 358/448 |
| 5,696,848 A * | 12/1997 | Patti | G06T 3/4053 | 348/E5.062 |
| 5,704,019 A * | 12/1997 | Akiyama | G06K 15/102 | 358/1.1 |
| 5,737,456 A * | 4/1998 | Carrington | B82Y 15/00 | 382/128 |
| 6,118,457 A * | 9/2000 | Ohtsuka | G06T 3/4007 | 345/620 |
| 6,289,137 B1 * | 9/2001 | Sugiyama | G06T 5/009 | 358/451 |
| 7,203,381 B2 * | 4/2007 | Motomura | G06T 3/40 | 382/280 |
| 2011/0019096 A1 | 1/2011 | Lee et al. | | |

OTHER PUBLICATIONS

Ioannis Katsavounidis et al: "Native Resolution Detection of Video Sequences", SMPTE 2015 Annual Technical Conference and Exhibition, Oct. 29, 2015 (Oct. 29, 2015), pp. 1-20, XP055297552, DOI: 10.5594/M001673 ISBN: 978-1-61482-956-0 the whole document.

Nyquist, Harry. "Certain topics in telegraph transmission theory." Transactions of the American Institute of Electrical Engineers 47, No. 2 (1928): 617-644.

J. J. B. Fourier, Thèore Analytique de la Chaleur., 1822, Chez Firmin Didot, père et fils.

J. W. Cooley, J. W. Tukey, "An algorithm for the machine calculation of complex fourier series", Math. Comput., vol. 19, pp. 297-301, 1965.

M. Frigo, S. G. Johnson, "The design and implementation of FFTW3", Proceedings of the IEEE, vol. 93, No. 2, pp. 216-231, 2005.

R. G. Keys, "Cubic convolution interpolation for digital image processing", IEEE Trans. on Acoustics Speech and Signal Processing, vol. ASSP-29, No. 6, pp. 1153-1160, 1981.

D. P. Mitchell, A. N. Netravali, "Reconstruction filters in computer graphics", Computer Graphics, vol. 22, No. 4, pp. 221-228, Aug. 1988.

\* cited by examiner

DETERMINING NATIVE RESOLUTIONS OF VIDEO SEQUENCES

CROSS-REFERENCE TO RELATED APPLICATIONS

This application claims benefit of the United States Provisional patent application having Ser. No. 62/184,183 and filed on Jun. 24, 2015. The subject matter of this related application is hereby incorporated herein by reference.

BACKGROUND OF THE INVENTION

Field of the Invention

Embodiments of the present invention relate generally to computer science and, more specifically, to techniques for determining native resolutions of video sequences.

Description of the Related Art

Video sequences may be presented in any number of different resolutions. Typically, the chosen resolution represents tradeoffs between resources required to generate and operate on the video sequence (e.g., camera resolution, processing time, bandwidth, storage, etc.) and visual quality. For example, if the resolution of a video sequence is 1080p, then each frame includes 2,073,600 pixels arranged into 1080 rows and 1920 columns. By contrast, if the resolution of a video sequence is 2160p, then each frame includes 8,294,400 pixels arranged into 2160 rows and 4096 columns. Since the 2160p video sequence includes four times more data than the 1080p video sequence, the visual quality of the 2160p video sequence displayed at the full resolution of 2160p is typically higher than the visual quality of the 1080p video sequence. However, as the resolution of a video sequence increases, storing the video sequence requires more memory, and transferring the video sequence requires more bandwidth. Further, generating and displaying the video sequence at a particular resolution requires equipment capable of supporting the particular resolution.

To reduce the resources required to operate on video sequences and/or comply with resolution limitations of equipment or processes, oftentimes a video sequence may undergo one or more down-sampling operations that reduce the amount of data included in the frames within the sequence. Subsequently, up-sampling operations may be applied to the video sequence for, among other things, compatibility with other video sequences and/or playback equipment. For instance, a video sequence may be up-sampled as part of splicing the video sequence with another video sequence that has been stored at a higher resolution to create a movie. Upon playback via an endpoint consumer device (such as a laptop), the movie may be viewed at the final, higher resolution. However, in general, because down-sampling operations eliminate selected information, subsequent up-sampling operations produce only an approximate reconstruction of the original video sequence. Consequently, if down-sampling and subsequent up-sampling operations have been performed on any portion of a video sequence, then the visual quality of the video sequence is compromised.

For example, to reduce the memory required to store a 2160p video sequence "A", the video sequence "A" could be down-sampled and then stored at a resolution of 1080p. Subsequently, to include the video sequence "A" in a 2160p movie, the video sequence "A" would need to be up-sampled to a resolution of 2160p. However, because the down-sampling operations would have eliminated selected information in the video sequence "A," the subsequent up-sampling operations would produce only an approximate reconstruction of the original video sequence "A." Notably, although the video sequence "A" included in the 2160p movie could be labeled as having a resolution of 2160p, the actual visual quality of the video sequence "A" included in the 2160p movie would be commensurate with an "effective resolution" of 1080p. Consequently, if the movie were displayed at 2160p, then the overall visual quality of the movie would be degraded compared to a true 2160p viewing experience.

As the above example illustrates, as a general matter, the lowest resolution at which a video sequence has been stored (referred to herein as the "native" resolution) determines the highest effective resolution with which the video sequence may be rendered and displayed. Consequently, this "native" resolution is more indicative of the visual quality of the video sequence than the "display" resolution at which the video sequence is delivered.

Furthermore, various operations performed on a video sequence are optimized based on the resolution of the video sequence. For example, efficiently and accurately encoding source data is essential for real-time delivery of video sequences. In operation, encoders are usually configured to make tradeoffs between resources consumed during the encoding/decoding process and visual quality based on the resolution of the video sequence. If an encoder is designed to optimize tradeoffs for a resolution that is higher than the "native" resolution of a video sequence included in a movie having a higher resolution, then the tradeoffs that the encoder may implement for the higher resolution can dramatically increase resource burdens, such as storage and bandwidth usage, when encoding the video sequence without noticeably increasing the visual quality of the video sequence.

Oftentimes, native resolutions of video sequences are unknown or difficult to determine. For example, the distributor of a movie may not be privy to any re-sampling operations that have been performed on any of the video sequences included in the movie. Observing the movie frame-by-frame during playback in an attempt to ascertain any degradation in visual quality associated with re-sampling operations would be prohibitively time consuming. However, unless the native resolution is ascertained, then the problems discussed above cannot be readily addressed.

As the foregoing illustrates, what is needed in the art are more effective techniques for determining the native resolutions of video sequences.

SUMMARY OF THE INVENTION

One embodiment of the present invention sets forth a computer-implemented method for generating spectra for characterizing re-sampling operations that have been performed on a scene within a video sequence. The method includes performing a transform operation on a color component associated with a first frame included in the scene to generate a first frame spectrum; normalizing a plurality of magnitudes associated with the first frame spectrum to generate a normalized first frame spectrum; and performing at least one operation on the normalized first frame spectrum to generate a first log-magnitude frame spectrum.

One advantage of the disclosed techniques for generating spectra is that native resolution engines may leverage these techniques to determine the lowest resolution at which a video sequence has been stored. Because this "native" resolution correlates better to the visual quality of the video sequence than the "display" resolution at which the video sequence is delivered, determining and communicating the native resolution ensures that the visual quality of the video sequence is correctly conveyed to users. Further, by tuning resolution-sensitive applications using the native resolution instead of the display resolution, the resources consumed by such applications may be reduced without degrading the final visual quality of the visual sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
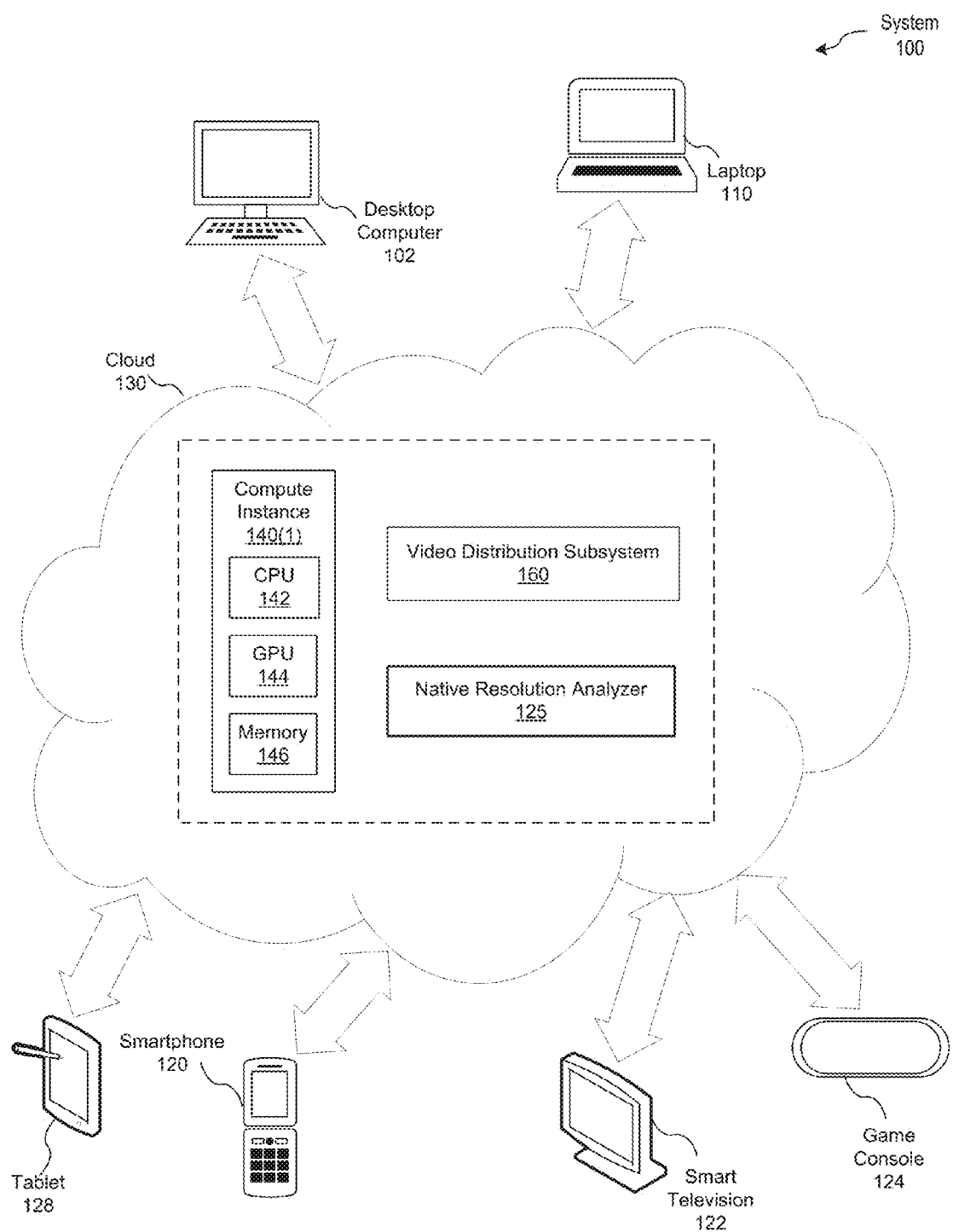
FIG. 1 is a conceptual illustration of a system configured to implement one or more aspects of the present invention.

FIG. 1 is a conceptual illustration of a system 100 configured to implement one or more aspects of the present invention. As shown, the system 100 includes a cloud 130 (e.g., encapsulated shared resources, software, data, etc.) connected to a variety of consumer devices capable of displaying video sequences. Such consumer devices include, without limitation, a desktop computer 102, a laptop 110, a smartphone 120, a smart television 122, a game console 124, a tablet 128, television-connected devices (not shown), handheld devices (not shown), and streaming entertainment devices (not shown). As used herein, a video sequence refers to any item that includes video content. Video sequences may be manipulated (e.g., stored, encoded, compressed, transmitted, etc.) using any mechanisms known in the art. For example, one video sequence may be included in a movie that is stored as a compressed audio-video file, transmitted via the internet to a consumer device, and then decompressed for display purposes.

The cloud 130 may include any number of compute instances 140 configured with any number (including zero) of central processing units (CPUs) 142, graphics processing units (GPUs) 144, memory 146, etc. In operation, the CPU 142 is the master processor of the compute instance 140, controlling and coordinating operations of other components included in the compute instance 140. In particular, the CPU 142 issues commands that control the operation of the GPU 144. The GPU 144 incorporates circuitry optimized for graphics and video processing, including, for example, video output circuitry. In various embodiments, GPU 144 may be integrated with one or more of other elements of the compute instance 140. The memory 146 stores content, such as software applications and video sequences, for use by the CPU 142 and the GPU 144 of the compute instance 140. In operation, the cloud 130 receives input user information from an input device (e.g., the laptop 110), one or more of the computer instances 140 operate on the user information, and the cloud 130 transmits processed information to the user.

In some embodiments, the cloud 130 processes video streams and delivers video services associated with the video streams to the consumer devices over a network, such as the Internet, via a video distribution subsystem 160. The video distribution subsystem 160 includes any number of applications that operate on the video streams. For example, the video distribution subsystem 160 may implement a user interface that enables users to select video sequences based on a variety of criteria. More specifically, for each video sequence, the user interface may provide information such as genre, actors, title, video length and resolution. Further, the video distribution subsystem 160 may include applications, such as encoders, that are optimized for real-time delivery of video streams based on a variety of criteria, including the resolution of the video sequence.

Notably, the resolution of a particular video sequence may dramatically impact, among other things, the visual quality of the video sequence and the efficiency with which applications operate on the video sequence. However, the ostensible resolution of a video sequence, referred to herein as the "display" resolution, may not reflect the lowest resolution with which the video sequence has been processed and stored. For example, to comply with resource constraints, such as memory limitations, applications may implement down-sampling techniques that eliminate selected information included in the video sequence. Subsequently, other applications may implement up-sampling techniques that attempt to reconstruct the original source data. However, because the down-sampling operations eliminated selected information, the subsequent up-sampling operations would produce only an approximate reconstruction of original source data. Accordingly, the visual quality of the reconstructed video sequence would be compromised.

In general, the conventional, display resolution is not necessarily a reliable indication of the visual quality as perceived when viewing a video sequence at full resolution. By contrast, the lowest resolution with which a video sequence has been stored is typically indicative of the highest effective resolution with which the video sequence may be rendered and displayed and, therefore, the perceived visual quality. Further, since this "native" resolution reflects the amount of unique information included in the video sequence, fine-tuning resolution-sensitive applications based on the native resolution instead of the display resolution may improve the efficiency of such applications.

For these reasons, the system 100 includes a native resolution analyzer 125 that extracts information from video sequences that relates to the characteristics of the video sequences, including whether any sampling operations may have been performed on the video sequences. Further, in some embodiments, the native resolution analyzer 125 deterministically computes the native resolution of video sequences. Among other things, the information obtained via the native resolution analyzer 125 may be used to correctly set visual quality expectations and optimize resolution-sensitive applications.

In alternate embodiments, the cloud 130 may be replaced with any type of cloud computing environment. In other embodiments, the system 100 may include any distributed computer system instead of the cloud 130. In yet other embodiments, the system 100 does not include the cloud 130 and, instead, the system 100 includes a single computing unit that implements any number of processing units (e.g., central processing units and/or graphical processing units in any combination).

Further, in some embodiments, the system 100 does not include the video distribution subsystem 160. For example, in some embodiments, the system 100 includes a single desktop computer 102 that stores the native resolution analyzer 125 in a memory device and a processing unit that executes the native resolution analyzer 125. The desktop computer 102 in such embodiments may or may not be connected to any external systems, such as the cloud 130, and may or may not implement any other video processing applications. In such systems, the native resolutions computed by the native resolution analyzer 125 may be used to "label" video streams to correctly set visual quality expectations and optimize resolution-sensitive applications.

Figure 2:
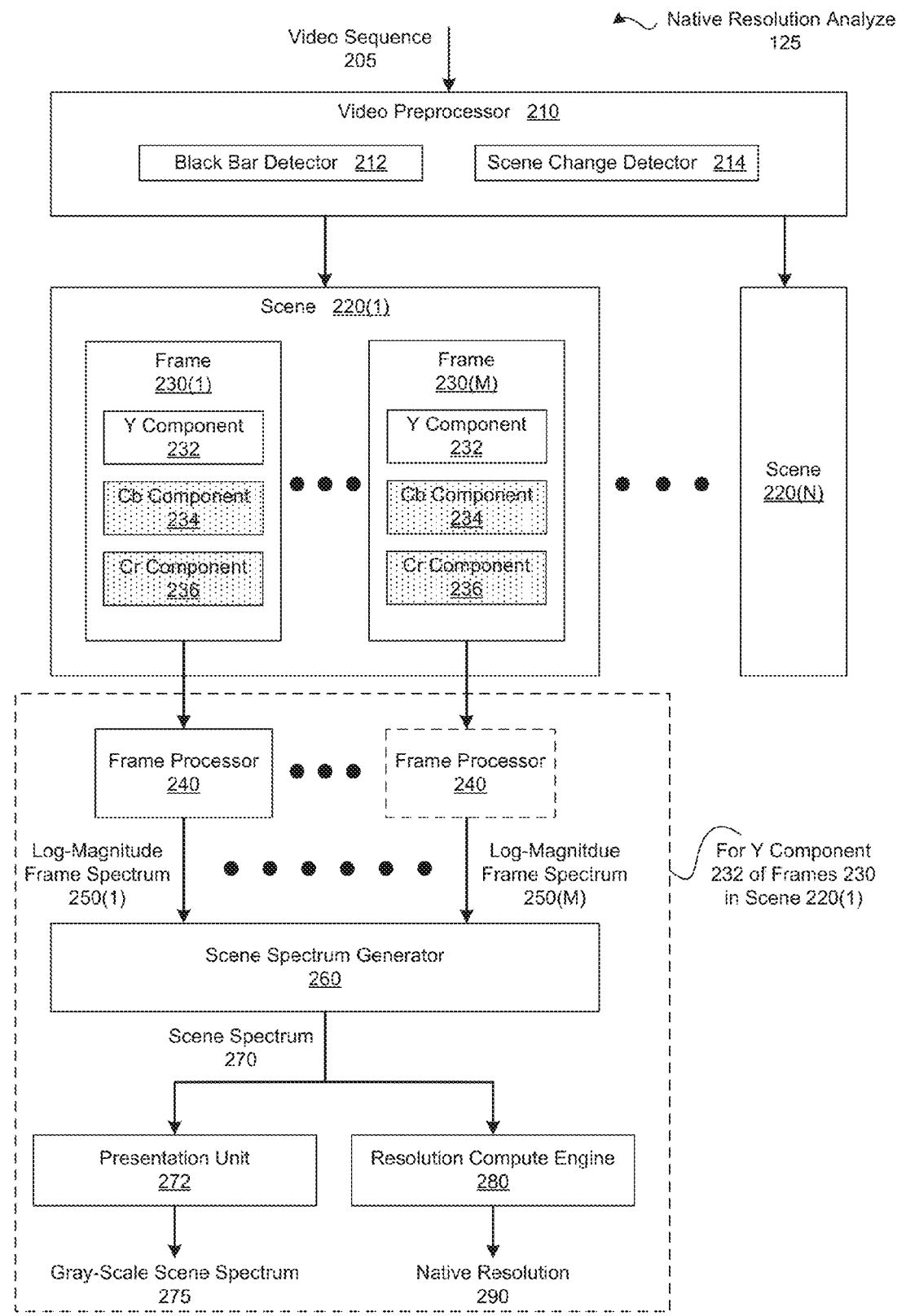
FIG. 2 is a more detailed illustration of the native resolution analyzer of FIG. 1 configured to process a video sequence, according to various embodiments of the present invention.

FIG. 2 is a more detailed illustration of the native resolution analyzer 125 of FIG. 1 configured to process a video sequence 205, according to various embodiments of the present invention. As shown, the native resolution analyzer 125 includes, without limitation, a video preprocessor 210, a frame processor 240, a scene spectrum generator 260, a presentation unit 272, and a resolution compute engine 280.

In operation, the video preprocessor 210 receives the video sequence 205 and performs one or more operations designed to extract meaningful, homogeneous regions from the video sequence 205. As shown, the video preprocessor 210 includes, without limitation, a black bar detector 212 and a scene change detector 124. The black bar detector 212 detects and subsequently removes any black horizontal bars and/or vertical bars that may be included in the video sequence 205. Such black bars may be introduced as part of modifying the video sequence 205 to achieve a particular video aspect ratio. As persons skilled in the art will recognize, the presence of black bars may interfere with the resolution analysis. The black bar detector 212 may implement any technically feasible algorithm to detect and subsequently remove any detected black bars.

The scene change detector 214 is configured to partition the video sequence 205 into one or more scenes 220. Each of the scenes 220 includes a sequence of one or more consecutive frames 230 that possess similar texture, luminance, and contrast characteristics. Because each of the scenes 220 may be generated and/or modified in a different fashion, the native resolution analyzer 125 determines the native resolution of each of the scenes 220 independently of the other scenes 220. For example, suppose that a video sequence 205 had a display resolution of 2160p and included the two scenes 220(1) and 220(2). Further, suppose that the scene 220(1) was recorded using a 1080p camera and then up-sampled to 2160p, while the scene 220(2) was recorded using a 2160p camera. In such a scenario, the scene change detector 214 would independently process the scenes 220(1) and 220(2), compute a native resolution of 1080p for the scene 220(1), and compute a native resolution of 2160p for the scene 220(2). The scene change detector 214 may implement any technically feasible algorithm for detecting and extracting the scenes 220 from the video sequence 205.

In general, the video preprocessor 210 may execute the black bar detector 212 and the scene change detector 214 in any order. Further, in alternate embodiments, the video preprocessor 210 may implement any number of additional preprocessing techniques designed to extract meaningful, homogeneous sequences of frames from the video sequence 205.

As shown, each of the frames 230 includes three color components: a Y component 232, a Cb component 234, and a Cr component 236. Since each of the color components exhibit inherently different spatial resolutions, the native resolution analyzer 125 is configured to process each of the Y component 232, the Cb component 234, and the Cr component 236 independently. More specifically, the native resolution analyzer 125 is configured to discard the Cb component 234 and the Cr component 236, and then determine the native resolution based on the Y component 232.

In alternate embodiments, the native resolution analyzer 125 may discard any number, include zero, of the three color components and determine the native resolution based on the remaining components. Further, in various embodiments, the techniques described herein may be applied to any color format, including, and without limitation, all Y/Cb/Cr formats (e.g., YUV420, YUV422, YUV444) as well as all RGB formats (e.g., RGB24).

The frame processor 240 is configured to operate on each of the frames 230 separately. Upon receiving the Y component 232 associated with the frame 230, the frame processor generates a log-magnitude frame spectrum 250. The log-magnitude frame spectrum 250 is a two-dimensional spectrum derived from the Y component 232, expressing every frequency in decibels (dB). Note that the spectral component of the log-magnitude frame spectrum 250 corresponding to a horizontal digital frequency of 0 and a vertical digital frequency of 0 is referred to herein as the "DC component," and the remaining spectral components are collectively referred to herein as the "AC components."

To generate the log-magnitude frame spectrum 250, the frame processor 240 first performs a Discrete Fourier Transform (DFT) on the Y component 232. The frame processor 240 may perform the DFT in any technically feasible fashion. For example, the frame processor 240 may implement a fast version of the DFT, known as the Fast Fourier Transform (FFT). Because the resolution analysis is based on energies and, therefore, the phase information is irrelevant, the frame processor 240 retains the magnitudes of the DFT complex-value spectra and discards the phases. For example, in some embodiments, the frame processor 240 may perform the DFT to calculate complex coefficients for each frequency. The frame processor 240 may then convert each of the complex coefficients from Cartesian coordinates (real+j*imaginary) to polar coordinates (|magnitude|*exp(j*phase)), retain the magnitudes, and discard the phases.

Subsequently, to ensure that the frames 230 contribute in a similar manner to the analysis of the scene 220 despite potentially disparate contrasts, the frame processor 240 normalizes the magnitude of the DFT spectra such that the total AC energy is one. More specifically, the frame processor 240 normalizes the magnitudes of the AC components such that the total is equal to one.

As persons skilled in the art will recognize, the physical size of surrounding objects (e.g., trees, walls, mountains, etc.) that typically predominate the images include in the frames 230 are relatively large. Accordingly, the spectra of the frames 230 exhibit a natural preference towards low frequencies. Such a preference is reflected in the normalized frame spectra. More specifically, in the normalized frame spectra, the magnitudes of the DFT spectra of low frequency components are oftentimes significantly larger than the magnitudes of the DFT spectra of high frequency components. To attenuate the magnitudes of the low frequency components and allow a higher dynamic range for the high frequency components, the frame processor 240 logarithmically scales the normalized magnitude spectrum, thereby generating the log-magnitude frame spectrum 250.

For each of the scenes 220, after generating the log-magnitude frame spectra 250 for all the frames 230 included in the scene 220, the scene spectrum generator 260 performs averaging operations that produce a scene spectrum 270. In operation, if the video sequence 205 includes "N" scenes 220, then the scene spectrum generator 260 generates N scene spectra 270(1)-270(N) corresponding to the Y components 232 associated with the N scenes 220. Similarly, in embodiments where the native resolution analyzer 125 retains and operates on the Y component 232, the Cb component 234, and the Cr component 236, the scene spectrum generator 260 generates 3×N scene spectra 270(1)-270(3×N). In general, each of the scene spectra 270 associated with each of the color components comprises a single, real-valued, two-dimensional array that represents the frequency components of the corresponding scene 220.

To facilitate visual analysis of the scene spectra, upon receiving the scene spectrum 270, the presentation unit 272 converts the scene spectrum 270 to a gray-level scene spectrum 275. In operation, for each of the scene spectra 270, the scene spectrum generator 260 maps the values included in the scene spectrum 270 to a range of gray-scale values that ranges from 0 to 255, where 0 is the lowest gray-scale value and 255 is the highest gray-scale value. In this fashion, the gray-level scene spectrum 275 represents magnitudes of less than $10^{-8}$ as 0, magnitudes of 1 as 255, and so forth. Accordingly, white pixel values in the gray-level scene spectrum 275 indicate high spectral components and black pixel values indicate low or zero spectral components.

The gray-level scene spectrum 275 may be used as a frequency "signature" for the corresponding scene 220. Notably, if no re-sampling operations have been performed on the frames 230 included in the scene 220, then the gray-level scene spectrum 275 exhibits a "healthy," naturally decaying gray-scale gradient with no abrupt changes. If, however, re-sampling (e.g., up-sampling and/or down-sampling) operations have been performed on the frames 230, then the gray-level scene spectrum 275 typically demonstrates certain patterns that indicate the type of re-sampling operations performed. Consequently, among other things, the scene spectra may be used to analyze the quality and characteristics of the scenes 220 and/or the video sequence 105 that includes the scenes 220.

For example, and without limitation, pattern recognition operations may be used to extract valuable information related to the characteristics of the natural scene shot and captured, the camera used to shoot and capture the natural scene, and the down-sampling operations (if any) implemented between capturing the natural scene and rendering the final video sequence 205. Further, pattern recognition operations may identify camera-inherent resolution limitation due to Bayer pattern sampling, special effects overlaying in lower resolutions, and color interpolation implemented to achieve YUV422 format compliance.

Also, also one or more techniques are described herein for classifying the scene spectra 270, any technically feasible approach or techniques for classifying the scene spectra 270 may be implemented, and all such implementations fall within the scope of the present invention. For example, and without limitation, computer vision-based or other similar techniques may be implemented to recognize "square" objects through edge detection (or other similar approach) using any known algorithm. In some embodiments, pattern recognition operations may be performed manually by visually inspecting any number of the scene spectra 270.

In some embodiments, the native resolution subsystem 125 also includes the resolution compute engine 280. The resolution compute engine 280 receives the scene spectrum 270 for the scene 220 and automatically and deterministically computes a native resolution 290 of the scene 220. Notably, the resolution compute engine 280 relies on a sharp fall in values included in the scene spectrum 270 that are characteristic of up-sampling operations to determine the native resolution 290.

Upon receiving the two-dimensional (2D) scene spectrum 270, the resolution compute engine 280 projects the scene spectrum 270 along rows and then folds the resulting one-dimensional (1D) spectrum to generate a 1 D horizontal spectrum. Similarly, the resolution compute engine 280 projects the scene spectrum along columns and then folds the resulting one-dimension (1D) spectrum to generate a 1 D vertical spectrum. As persons skilled in the art will recognize, the 1 D horizontal spectrum and the 1 D vertical spectrum indicate relative amounts of energy (logarithmically scaled) in the spatial frequency domain.

Subsequently, the resolution compute engine 280 integrates the 1 D horizontal spectrum to produce a cumulative distribution function (CDF) of energies, also referred to herein as the horizontal distribution function and the horizontal CDF. Similarly, the resolution compute engine 280 integrates the 1 D vertical spectrum to produce cumulative distribution function (CDF) of energies, referred to herein as the vertical distribution function and the vertical CDF. For each of the CDFs, the resolution compute engine 280 performs a variety of curve fitting operations designed to produce a best-fitting two segment line.

The resolution compute engine 280 may implement any technically feasible techniques to generate the two segment line. For example, in some embodiments, to generate a best-fitting two segment line for a particular CDF, the resolution compute engine 280 selects a one segment line that extends from one end point of the CDF to the other end point of the CDF. The resolution compute engine 280 then computes the area between the CDF and the one segment line, referred to herein as the "one segment area-under-curve." Subsequently, the resolution compute engine 280 creates a two segment line that extends from one end point of the CDF to the other end point of the CDF, where the two segments intersect at a "knee point." The resolution compute engine 280 optimizes the location of the knee point to minimize the area between the CDF and the two segment line, referred to herein as the "two segment area-under-curve." The resolution compute engine 280 then divides the one segment area-under-curve by the two segment area-under curve, thereby computing a quality fit factor for the two segment line.

In this fashion, as part of performing the curve fitting operations for the horizontal CDF, the resolution compute engine 280 computes a horizontal knee point and a horizontal quality fit factor. As part for performing the curve fitting operations for the vertical CDF, the resolution compute engine 280 computes a vertical knee point and a vertical quality fit factor.

If the quality fit factors are less than a predetermined quality threshold, then the resolution compute engine 280 determines that the scene spectrum 270 represents a naturally decaying spectrum and the corresponding scene 220 has not been subjected to any up-sampling operations. Consequently, the resolution compute engine 280 sets the native resolution equal to the display resolution and ceases operation. By contrast, if the quality fit factors are not less than the quality threshold, then the resolution compute engine 280 determines that the corresponding scene 220 may have been subjected to one or more up-sampling operations. Accordingly, the resolution compute engine 280 continues to analyze the scene spectrum 270 in conjunction with the CDFs to determine the native resolution. The quality threshold may be set in any technically feasible fashion that is consistent with the characteristics of up-sampling operations.

Based on the knee points, the resolution compute engine 280 generates a "low frequency rectangle." More specifically, the resolution compute engine 280 identifies a low frequency rectangular region included in the scene spectrum 270 that is centered on the DC frequency. This low frequency rectangular region has a width equal to twice the spatial frequency of the horizontal knee point and a height equal to twice the spatial frequency of the vertical knee point. The resolution compute engine 280 also generates a bounding box that represents a larger rectangular region included in the scene spectrum 270. The bounding box is centered on the DC frequency with a width equal to the final horizontal resolution and a height the equal to the final vertical resolution. Note that the resolution compute engine 280 adjusts the size of the bounding box to reflect the removal of any black bars by the video preprocessor 230.

The resolution compute engine 280 computes a low frequency energy density as the AC energy associated with the low frequency rectangle divided by the area of the low frequency rectangle. Notably, the AC energy associated with the low frequency rectangle is the sum of the magnitudes of the AC components included in the scene spectrum 170 that lie within the low frequency rectangle. Further, the resolution compute engine 280 defines a high frequency region as the region that lies outside the low frequency rectangle but within the bounding box. The resolution compute engine 280 computes a high frequency energy density as the AC energy associated with the high frequency region divided by the area of the high frequency region.

Finally, the resolution compute engine 280 computes the ratio of the low frequency energy density to the high frequency energy density, and uses this frequency to determine the native resolution associated with the scene spectrum 270. In general, the higher the "energy density ratio" between the low frequency energy density and the high frequency energy density, the more likely the frames 230 included in the scene 220 include low-frequency components. Since such low-frequency components are indicative of up-sampling operations, the resolution compute engine 280 compares the energy density ratio to a predetermined energy density threshold to determine whether up-sampling operations have been performed on the scene 220.

If the energy density ratio is less than the energy density threshold, then the resolution compute engine 280 determines that the scene spectrum 270 represents a naturally decaying spectrum and up-sampling operations have not been performed on the corresponding scene 220. Consequently, the resolution compute engine 280 sets the native resolution equal to the display resolution and ceases operation. By contrast, if the energy density ratio is not less than the energy density threshold, then the resolution compute engine 280 determines that one or more up-sampling operations have been performed on the corresponding scene 220. Further, the resolution compute engine 280 determines that the native resolution of the scene 220 is equal to the dimensions of the low frequency rectangle.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the techniques described herein may be applied to any color format, including, and without limitation, all Y/Cb/Cr formats (e.g., YUV420, YUV422, YUV444) as well as all RGB formats (e.g., RGB24 or GBR888). Also, although one or more techniques are described for classifying the normalized log spectra, any technically feasible approach or techniques for classifying the normalized log spectra may be implemented, and all such implementations fall within the scope of the present invention. Further although only the Y component is isolated and used in certain implementations, the Cb component or the Cr component may be isolated and used in other implementations. The same holds equally true for implementations involving RGB formats.

Finally the different thresholds discussed herein are exemplary only and are not intended to limit the scope of the present invention. For example, and without limitation, the threshold used to detect black lines can be selected through any type of testing or machine-learning technique or can be user-programmable and based on any number of factors, including and without limitation, familiarity with the characteristics of the video asset being analyzed. Similarly the quality and energy density thresholds for categorizing a given scene as "up-sampled" or not is are tunable parameters that may be refined over time or determined through statistical analysis of the video sequence being analyzed.

Generating Gray-Scale Scene Spectra

Figure 3:
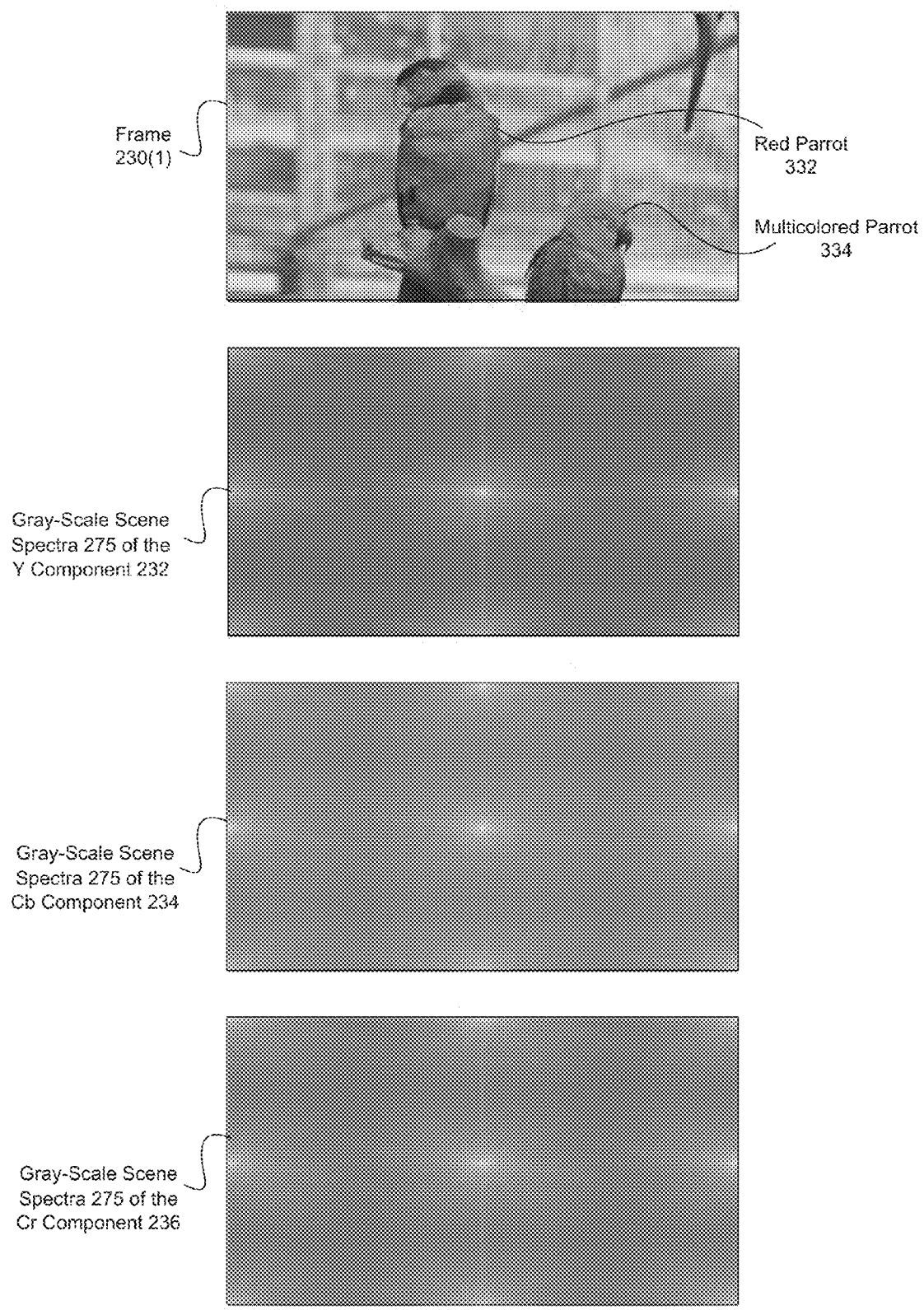
FIG. 3 is an example of gray-scale scene spectra that the native resolution analyzer of FIG. 2 is configured to generate based on a given scene within a video sequence, according to various embodiments of the present invention.

FIG. 3 is an example of the gray-scale scene spectra 275 that the native resolution analyzer 125 of FIG. 2 is configured to generate based on a given scene 220 within the video sequence 205, according to various embodiments of the present invention. Notably, the native resolution matches the display resolution of the scene 220 depicted in FIG. 3.

As shown for the frame 230(1) of the scene 220, the scene 220 includes images of a red parrot 332 and a multicolored parrot 334 along with background surrounding images. For the scene 220, the native resolution analyzer 125 generates three separate gray-scale scene spectra 275: the gray-scale scene spectra 275 of the Y component 232, the gray-scale scene spectra 275 of the Cb component 234, and the gray-scale scene spectra 275 of the Cr component 236.

As persons skilled in the art will recognize, due to the periodic nature of the DFT, the gray-scale scene spectra 275 include multiple identical regions, referred to herein as tiles. Notably, the gray-scale scene spectra 275 depicted in FIG. 3 demonstrate gradually decaying gray-scale gradients across each tile as the frequencies increase both horizontally and vertically from the DC spectral frequency at the center of each tile. Such a "healthy" distribution indicates that no up-sampling operations have been performed on the scene 220. Notably, the gray-scale scene spectra 275 lack the sharp suppression of high frequencies that is characteristic of up-sampling operations.

Figure 4:
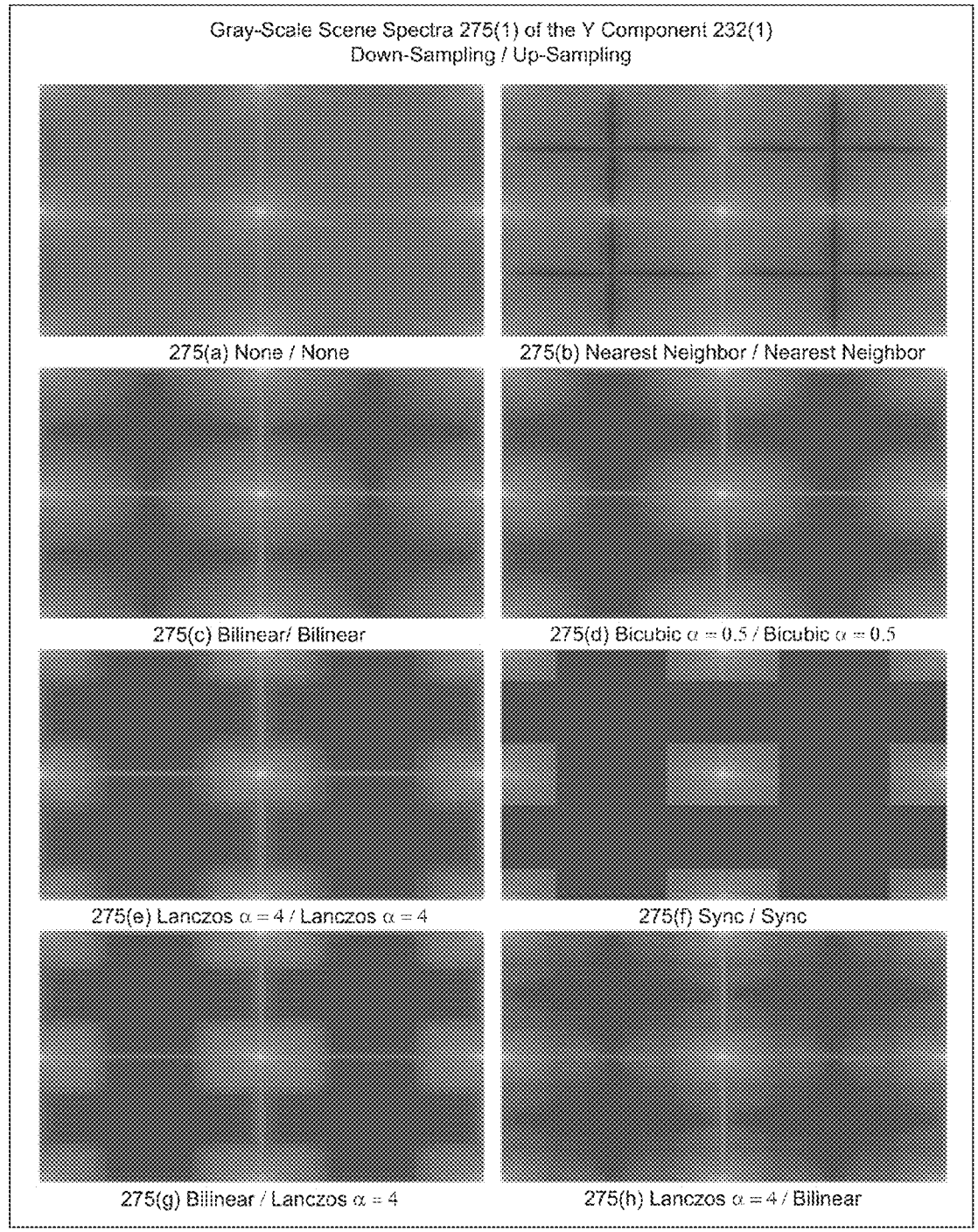
FIG. 4 is an example of gray-scale scene spectra that the native resolution analyzer of FIG. 2 is configured to generate based on multiple scenes within a video sequence, according to various other embodiments of the present invention.

FIG. 4 is an example of the gray-scale scene spectra 275 that the native resolution analyzer 125 of FIG. 2 is configured to generate based on multiple scenes 220 within the video sequence 205, according to various other embodiments of the present invention. Notably, the native resolutions do not match the display resolutions of the scenes 220 depicted in FIG. 4.

For explanatory purposes, referring back to FIG. 3, the scene 220 that includes the red parrot 332 and the multicolored parrot 332 has a native resolution that equals the display resolution of 1920×1080. In the context of FIG. 4, the scene 220 is referred to as the scene 220(a). The scene 220(a) is down-sampled to 960×540 and then up-sampled to 1920×1080 using seven different combinations of sampling techniques to generate the seven scenes 220(b)-220(h):

|  | Down-Sampling | Up-Sampling |
| --- | --- | --- |
| Original a | None | None |
| b | Nearest Neighbor | Nearest Neighbor |
| c | Bilinear | Bilinear |
| d | Bicubic α = 0.5 | Bicubic α = 0.5 |
| e | Lanczos α = 4 | Lanczos α = 4 |
| f | Sinc | Sinc |
| g | Bilinear | Lanczos α = 4 |
| h | Lanczos α = 4 | Bilinear |

Notably, each of the scenes 220(b)-(h) has a native resolution of 960×540, but a display resolution of 1920×1080.

The native resolution analyzer 125 generates the gray-scale scene spectra 275 for the Y component 232 associated with the scenes 220(a)-(h), thereby generating eight different gray-scale scene spectra 275(a)-(h). The gray-scale scene spectrum 275(a) corresponding to the original scene 220(a) demonstrates a healthy distribution of spectral components across each tile. Notably, each of the gray-scale scene spectra 275(b)-275(h) resembles the gray-scale scene spectrum 275 at low frequencies. However, each of the gray-scale scene spectra 275(b)-275(h) demonstrate high frequency suppression with attenuated spectral replication horizontally and/or vertically. As shown, the pattern of high frequency suppression correlates to the type of the up-sampling operation performed on the processed version of the scene 220. Further, in general, the size of the healthy region surrounding the DC component that does not exhibit produced attenuation is indicative of the native resolution of the processed version of the scene 220.

Figure 5:
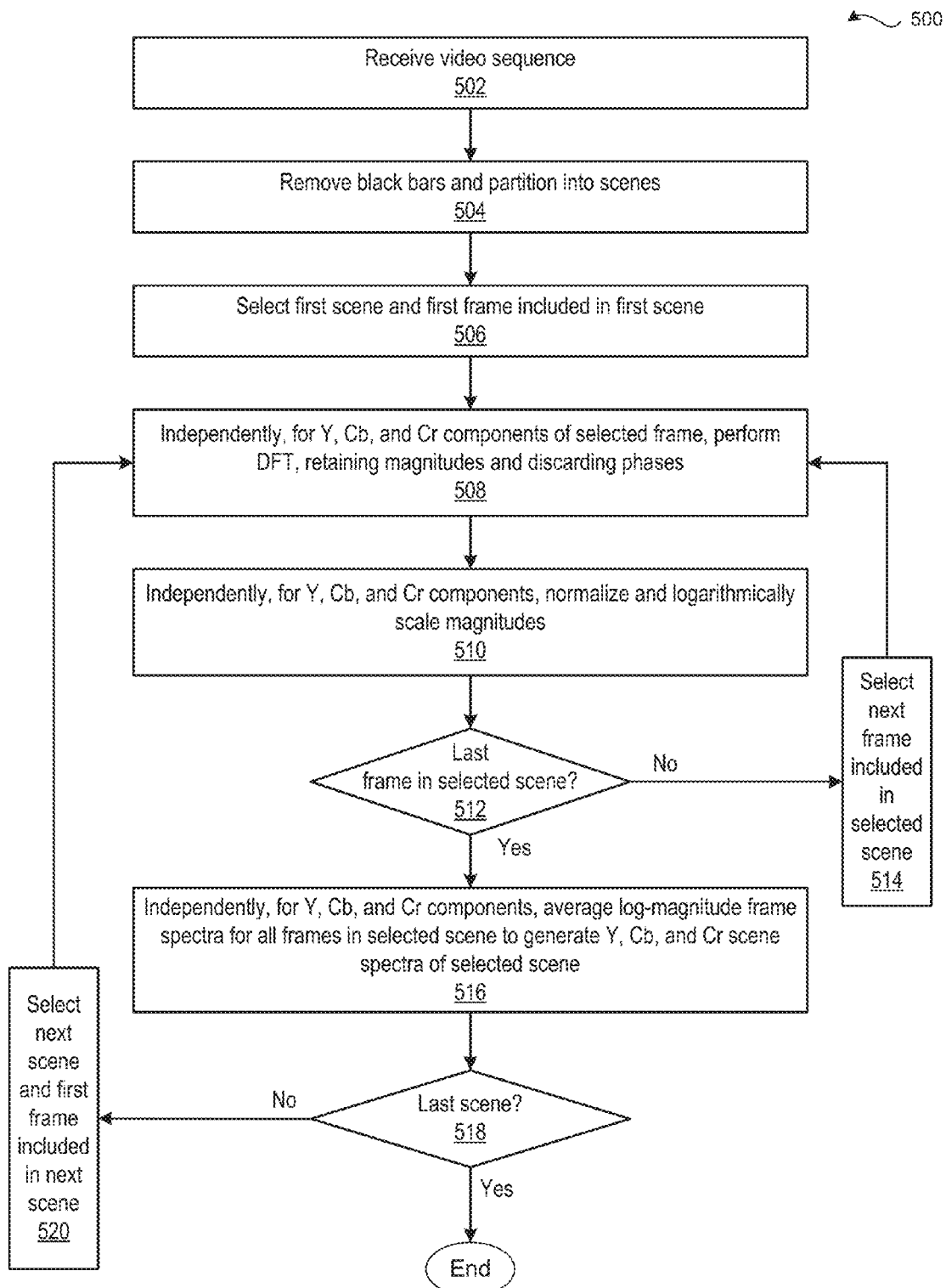
FIG. 5 is a flow diagram of method steps for deriving scene spectra from a video sequence, according to various embodiments of the present invention.

FIG. 5 is a flow diagram of method steps for deriving scene spectra from a video sequence, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the native resolution analyzer 125 receives the video sequence 205. At step 504, the video preprocessor 210 identifies and subsequently removes any black bars included in the video sequence 205. The video preprocessor 210 then partitions the video sequence 205 into the scenes 220. At step 506, the native resolution analyzer 125 selects the first scene 220 and the first frame 230 included in the first scene 220.

At step 508, the frame processor 240 performs a Discrete Fourier Transform (DFT) on each of the color components included in the selected frame 220. More specifically, the frame processor 240 performs three DFTs: a DFT on the Y component 232, a DFT on the Cb component 234, and a DFT on the Cr component 236. As part of step 508, because phase information is not relevant to the resolution analysis, the frame processor 240 discards the phases but retains the magnitudes of the DFT spectra.

At step 510, the frame processor 240 performs normalization and scaling operations on each of the three DFT spectra (corresponding to the three color components). More precisely, the frame processor 240 normalizes the magnitude of each of the DFT spectra such that the total AC energy is one. The frame processor 240 then logarithmically scales each of the normalized magnitude spectra, thereby generating the three log-magnitude frame spectra 250.

At step 512, the native resolution analyzer 125 determines whether the selected frame 230 is the last frame 230 included in the selected scene 220. If, at step 512, native resolution analyzer 125 determines that the selected frame 230 is not the last frame 230 included in the selected scene 220, then the native resolution analyzer 125 proceeds to step 514. At step 514, the frame processor 240 selects the next frame 230 included in the selected scene 220. The method 500 then returns to step 508, where the frame processor 240 generates the three log-magnitude spectra 250 for the selected frame 230. The native resolution analyzer 125 continues to cycle through steps 508-514, generating three log-magnitude frame spectra 250 for each of the frames 230 included in the selected scene 220, until the frame processor 240 generates the log-magnitude frame spectra 250 for the last frame 230 included in the selected scene 220.

If, however, at step 512, the native resolution analyzer 125 determines that the selected frame 230 is the last frame included in the selected scene 220, then the method 500 proceeds directly to step 516. At step 516, the scene spectrum generator 260 performs averaging operations that produce three scene spectra 270 associated with the selected scene 220. In particular, the scene spectrum generator 260 averages the log-magnitude frame spectra 250 of the Y components 232 for all the frames 230 included in the selected scene 220 to create the scene spectrum 270 of the Y component 232 associated with the selected scene 230. Similarly, the scene spectrum generator 260 averages the log-magnitude frame spectra 250 of the Cb components 234 for all the frames 220 included in the selected scene 230 to create the scene spectrum 270 of the Cb component 234 associated with the selected scene 230. Finally, the scene spectrum generator 260 averages the log-magnitude frame spectra 250 of the Cr components 236 for all the frames 220 included in the selected scene 230 to create the scene spectrum 270 of the Cb component 236 associated with the selected scene 230.

At step 518, the native resolution analyzer 125 determines whether the selected scene 220 is the last scene 220 included in the video sequence 205. If, at step 518, the native resolution analyzer 125 determines that the selected scene 220 is not the last scene 220 included in the selected scene 220, then the frame processor 240 proceeds to step 520. At step 520, the frame processor 240 selects the next scene 220 included in the video sequence 205 and the first frame 230 included in the next scene 220. The method 500 then returns to step 508, where the frame processor 240 generate the three log-magnitude spectra 250 for the selected frame 230. The native resolution analyzer 125 continues to cycle through steps 508-518, generating three scene spectra 270 for each of the scenes 220 included in the video sequence 205, until the frame processor 240 generates the scene spectra 270 for the last scene 220 included in the video sequence 205. The method 500 then terminates.

Computing Native Resolutions

Figure 6:
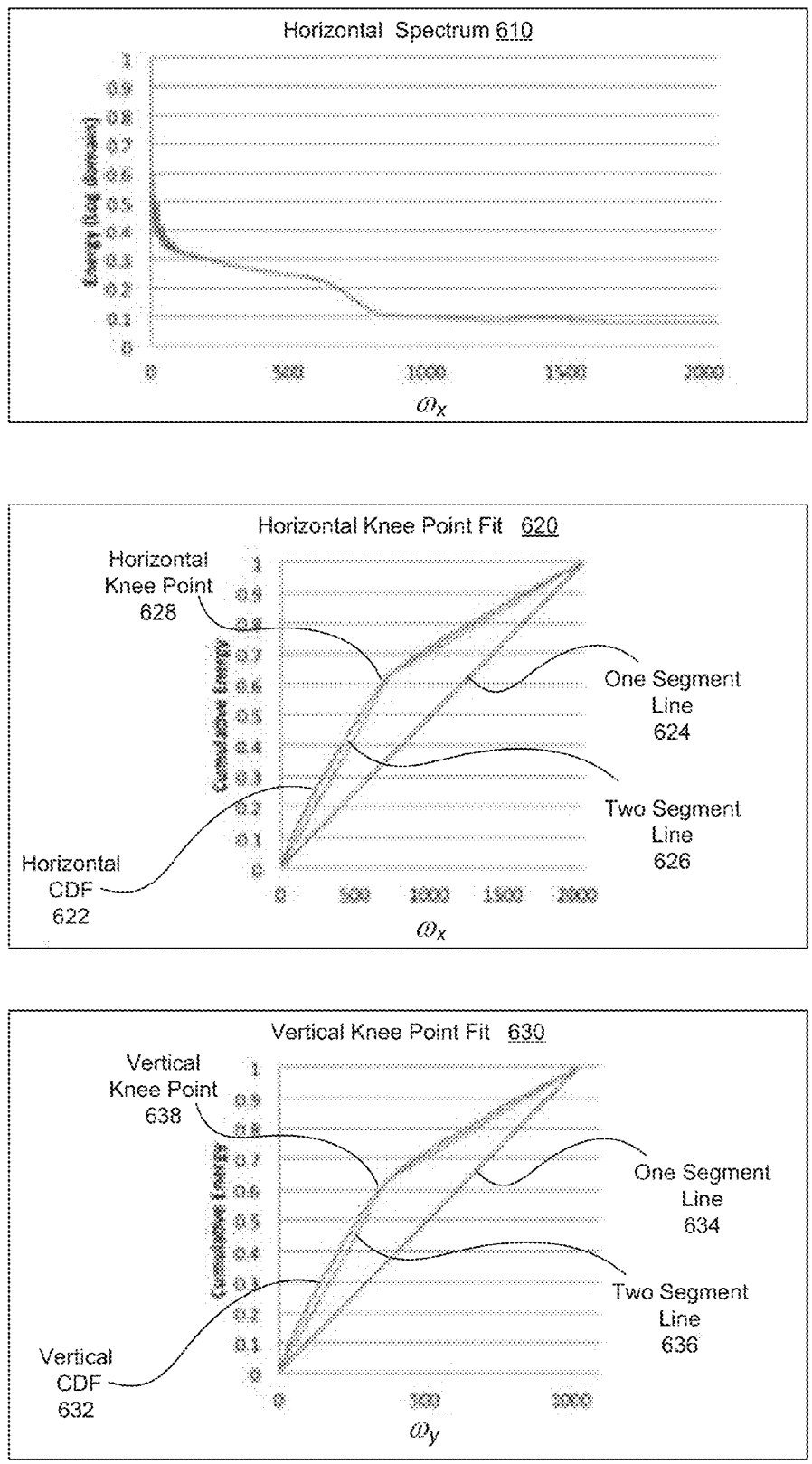
FIG. 6 are examples of a horizontal knee point and a vertical knee point associated with a scene spectrum that may be computed by the resolution compute engine of FIG. 2, according to various embodiments of the present invention.

FIG. 6 are examples of a horizontal knee point 628 and a vertical knee point 638 associated with the scene spectrum 270 that may be computed by the resolution compute engine 280 of FIG. 2, according to various embodiments of the present invention. As described in conjunction with FIG. 2, as part of determining the native resolution of the scene 220, the resolution compute engine 280 determines the horizontal knee point 628 and the vertical knee point 638 based on the two-dimensional (2D) scene spectrum 270.

The scene spectrum 270 may be derived from any one of the Y component 232, the Cb component 234, and the Cr component 236 of the frames 230 included in the scene 220. Further, the resolution compute engine 280 may be configured to independently determine the native resolution 290 based on any number of the Y component 232, the Cb component 234, and the Cr component 236.

In operation, the resolution compute engine 280 projects the scene spectrum 270 along rows to generate a horizontal spectrum 610 that indicates relative amounts of energy (logarithmically scaled) in the spatial frequency domain. Subsequently, the resolution compute engine 280 integrates the horizontal spectrum 610 to produce a horizontal cumulative distribution function (CDF) 622. The resolution compute engine 280 then performs a horizontal knee point fit 620. More specifically, as shown, the resolution compute engine 280 generates a one segment line 624 that approximates the horizontal CDF 622 as well as a two segment line 626 that approximates the horizontal CDF 622.

After determining the one segment line 624 and the two segment line 626 that approximate the horizontal CDF 622, the resolution compute engine 280 sets the horizontal knee point 628 to the point at which the two segments included in the two segment line 626 meet. Notably, as shown, the spectral frequency of the horizontal knee point 628 is 640.

In a similar fashion, the resolution compute engine 280 projects the scene spectrum 270 along columns to generates a vertical spectrum (not shown) that indicates relative amounts of energy (logarithmically scaled) in the spatial frequency domain. Subsequently, the resolution compute engine 280 integrates the vertical spectrum 610 to produce a vertical cumulative distribution function (CDF) 632. The resolution compute engine 280 then performs a vertical knee point fit 630. More specifically, as shown, the resolution compute engine 280 generates a one segment line 634 that approximates the vertical CDF 632 as well as a two segment line 636 that approximates the vertical CDF 632.

After determining the one segment line 634 and the two segment line 636 that approximate the vertical CDF 632, the resolution compute engine 280 sets the vertical knee point 638 to the point at which the two segments included in the two segment line 636 meet. Notably, as shown, the spectral frequency of the vertical knee point 638 is 370.

Figure 7:
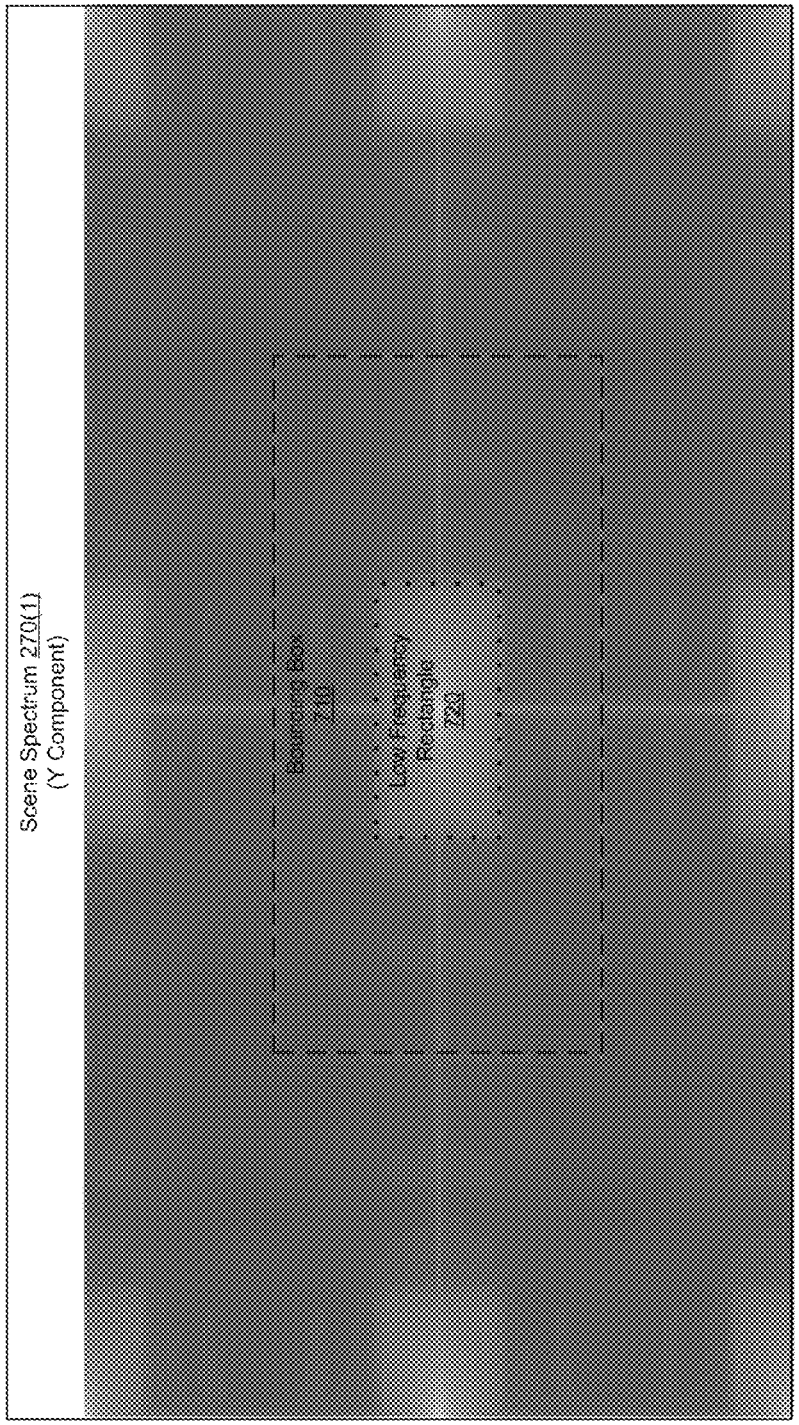
FIG. 7 is an example of a native resolution associated with a scene spectrum that may be computed by the resolution compute engine of FIG. 2, according to various embodiments of the present invention.

FIG. 7 is an example of the native resolution 290 associated with the scene spectrum 270 that may be computed by the resolution compute engine 280 of FIG. 2, according to various embodiments of the present invention. For explanatory purposes, the context of FIG. 7 is that the resolution compute engine 280 has computed the horizontal knee point 628 and the vertical knee point 638 as illustrated in FIG. 6. More specifically, the spectral frequency of the horizontal knee point 628 is 640 and the spectral frequency of the vertical knee point 638 is 370. Further, the display resolution of the scene 220 associated with the scene spectrum 270 is 4096×2160.

Based on the horizontal knee point 628 and the vertical knee point 638, the resolution compute engine performs resolution calculations 730. First as described in conjunction with FIG. 2, the resolution compute engine 280 uses the horizontal knee point 628 and the vertical knee point 638 to identify a low frequency rectangle 720. The low frequency rectangle 720 is centered at the DC frequency with a width equal to twice the horizontal knee point 628 and a height equal to twice the spatial frequency of the vertical knee point 638. Accordingly, the resolution compute engine 280 sets the dimensions of the low frequency rectangle 720 to 1280×720. The resolution compute engine 280 also generates a bounding box 710 that is centered at the DC frequency with a width equal to the final horizontal resolution (4096) and a height equal to the final vertical resolution (2160).

Subsequently, the resolution compute engine 280 computes a low frequency energy density (LFD) as the sum of the magnitudes of the AC components included in the scene spectrum 170 that lie within the low frequency rectangle 720 divided by the area of the low frequency rectangle 720. In an analogous fashion, the resolution compute engine 280 computes a high frequency energy density (HFD) based on the subset of the scene spectrum 270 that lies outside the low frequency rectangle but within the bounding box 710. The resolution compute engine 280 then divides the LFD by the HFD to generate an energy density ratio. As shown, the resolution compute engine 280 determines that the energy density ratio of the scene spectrum 270 is 5.4

In general, the likelihood that up-sampling operations have been performed on the frames 130 included in the scene 220 correlates to the energy density ratio. Consequently, the resolution compute engine 280 implements an energy threshold to determine whether up-sampling operations have been performed on the scene spectrum 270. Notably, the values of the energy threshold implemented in the resolution compute engine 280 is 3. A value of 3 for the predetermined energy threshold reflects experimental results that indicate that high frequencies that are more than three orders of magnitude smaller than low frequencies are indicative of up-sampling. In alternative embodiments, the energy threshold may be determined in any technical fashion, based on any type of information, and may be any value. For example, in some embodiments, the energy threshold may be set based on user input.

Because the energy density ratio of the scene spectrum 270 (5.4) exceeds the energy density ratio (3), the resolution compute engine 270 determines that the native resolution 190 of the scene 270 is equal to the dimensions of the low frequency rectangle 720. Consequently, the resolution compute engine 270 determines that the native resolution 190 associated with the scene spectrum 270 is 1280×720.

Figure 8:
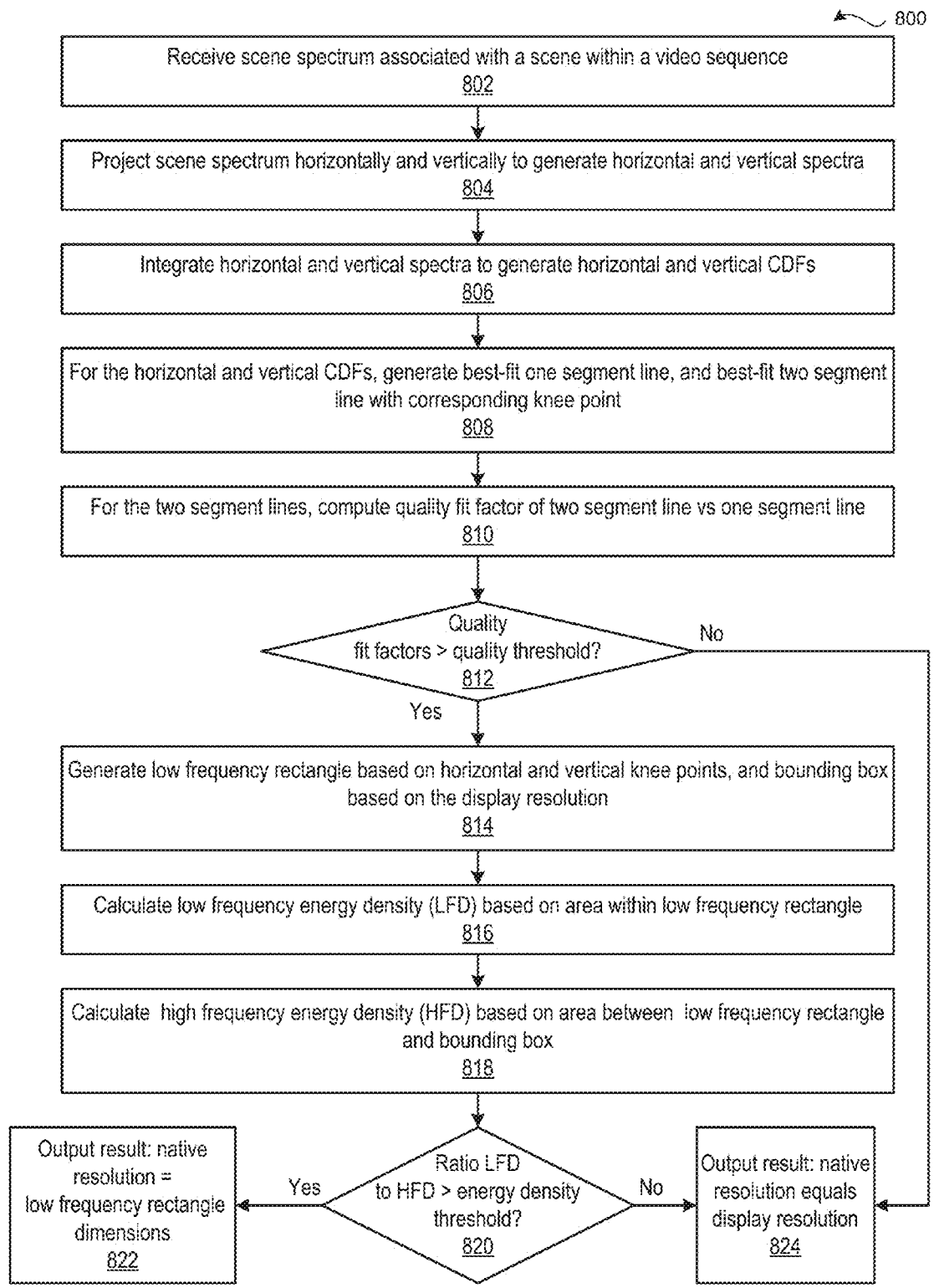
FIG. 8 is a flow diagram of method steps for computing the native resolution of a scene within a video sequence, according to various embodiments of the present invention.

FIG. 8 is a flow diagram of method steps for computing the native resolution of a scene within a video sequence, according to various embodiments of the present invention. Although the method steps are described with reference to the systems of FIGS. 1-4 and 6-7, persons skilled in the art will understand that any system configured to implement the method steps, in any order, falls within the scope of the present invention.

As shown, a method 800 begins at step 802, where the resolution compute engine 280 receives the two-dimensional (2D) scene spectrum 270 associated with the scene 220 within the video sequence 205. For discussion purposes only, it is assumed in this description of FIG. 8 the scene spectrum 270 is generated any technically feasible fashion. For example, the native resolution analyzer could implement the method steps of FIG. 5 to generate the scene spectrum 270.

At step 804, the resolution compute engine 280 projects the scene spectrum 270 along rows and folds the resulting one-dimensional (1D) spectrum to generate the 1 D horizontal spectrum 610. Similarly, the resolution compute engine 280 projects the scene spectrum along columns and folds the resulting one-dimension (1D) spectrum to generate a 1 D vertical spectrum. As persons skilled in the art will recognize, the horizontal spectrum 610 and the vertical spectrum indicate relative amounts of energy (logarithmically scaled) in the spatial frequency domain.

At step 806, the resolution compute engine 280 integrates the horizontal spectrum 610 and the vertical spectrum to produce, respectively, the horizontal CDF 622 and the vertical CDF 632. At step 808, for each of the CDFs, the resolution compute engine 280 generates a best-fit one segment line, and a best-fit two segment line. The resolution compute engine 280 may perform the curve-fitting operations to generate the one segment lines and the two segment lines in any technically feasible fashion. The intersection of the two segments of the two segment line that approximates the horizontal CDF 622 defines the horizontal knee point 628, while the intersection of the two segments of the two segment line that approximates the vertical CDF 632 defines the vertical knee point 638.

At step 810, for each of the two segment lines, the resolution compute engine 280 computes a quality fit factor. The resolution compute engine 280 may compute the quality fit factor in any technically feasible fashion. For example, in some embodiments, to compute the quality fit factor for a particular two segment line, the resolution compute engine 280 computes the area between the CDF and the best-fit one segment line, referred to herein as the "one segment area-under-curve." The resolution compute engine 280 then computes the area between the CDF and the two segment line, referred to herein as the "two segment area-under-curve." Finally, the resolution compute engine 280 divides the one segment area-under-curve by the two segment area-under-curve to compute the quality fit factor for the two segment line.

At step 812, the resolution compute engine 280 compares the quality fit factor for the two segment lines that approximate the horizontal CDF 622 and the vertical CDF 624 to a predetermined quality threshold. The predetermined quality threshold may be determined in any technically feasible fashion. If, at step 812, the resolution compute engine 280 determines that both of the quality fit factors exceed the quality threshold, then the method 800 proceeds to step 814. At step 814, the resolution compute engine 280 generates the low frequency rectangle 720 based on the horizontal knee point 628 and the vertical knee point 628, and the bounding box 710 based on the display resolution of the scene 220 associated with the scene spectrum 270. The resolution compute engine 280 centers both the low frequency rectangle 720 and the bounding box 710 at the DC component of the scene spectrum 270.

At step 816, the resolution compute engine 280 computes a low frequency energy density (LFD) based on the area within the low frequency rectangle 720. At step 818, the resolution compute engine 280 computes a high frequency energy density (HFD) based on the area that is outside the low frequency rectangle 720, but within the bounding box 710. At step 820, the resolution compute engine divides the LFD by the HDF to compute an energy density ratio and then compares this energy density ratio to an energy density threshold. If, at step 820, the energy density ratio exceeds the energy density threshold, then the resolution compute engine 280 proceeds to step 822. At step 822, the resolutions compute engine 280 sets the native resolution 190 to match the dimensions of the low frequency rectangle 720, and the method 800 terminates.

If, however, at step 820, the resolution compute engine 280 determines that the energy density ratio does not exceed the energy density threshold, then the method 800 proceeds directly to step 824.

If, however, at step 812, the resolution compute engine 280 determines that one or more of the quality fit factors do not exceed the quality threshold, then the method 800 proceeds directly to step 824.

At step 824, the resolution compute engine 280 determines that the scene spectrum 270 represents a naturally decaying spectrum and no up-sampling operations have been performed on the associated scene 220. Consequently, the resolution compute engine 280 sets the native resolution equal to the display resolution of the scene 220 and the method 800 terminates.

In sum, the disclosed techniques may be used to determine the lowest resolutions with which scenes within a video sequence have been processed. In operation, to determine these "native" resolutions, a video preprocessor divides the video sequence into scenes, where the frames included in each scene exhibit relatively uniform texture, luminance, and contrast characteristics. For each of the frames, a frame processor performs Fast Fourier Transforms on each of the color components (Y, Cb, and Cr) and normalizes the magnitude of the resulting spectrum such that the total AC energy equals one. The frame processor then logarithmically scales the normalized frame spectrum to generate log-magnitude spectra for the Y, Cb, and Cr components of each frame.

A scene spectrum generator then performs averaging operations that coalesce the log-magnitude spectra for the frames included in the scene into scene spectra. More specifically, for each scene, the scene spectrum generator generates a Y component scene spectrum, a Cb component scene spectrum, and a Cr component scene spectrum. Notably, if the scene spectrum has undergone re-sampling operations, then the scene spectrum demonstrates certain distinct and recognizable patterns. Consequently, persons skilled in the art may apply any technically feasible pattern recognition technique (including visual inspection) to the scene spectrum to detect whether the native resolution of the scene is less than the display resolution.

Further, in some embodiments, a resolution compute engine automatically and deterministically compute the native resolution of a scene based on the scene spectrum. In operation, the resolution compute engine projects a scene spectrum along rows to create a one-dimensional horizontal spectrum and along columns to create a one-dimensional vertical spectrum. The scene spectrum generator then individually integrates the horizontal and vertical spectra to create cumulative distribution functions (CDFs) of energies. Subsequently, the scene spectrum generator performs best fit operations that approximate each of the cumulative distribution functions with a two segment line, where the spatial frequency at the intersection of the two segments defines a "knee point."

Based on a horizontal knee point associated with the horizontal CDF and a vertical knee point associated with the vertical CDF, the scene spectrum generator creates a low frequency rectangle. The scene spectrum generator then determines the total AC energy in the low-frequency rectangle and a high-frequency region that lies outside the low frequency rectangle but within the bounding box defined by the sampling frequency associated with the display resolution. If the ratio of the low-frequency AC energy to the high-frequency AC energy exceeds a predetermined energy density threshold, then the scene spectrum generator determines that the native resolution is lower than the display resolution. More specifically, the scene spectrum generator determines that the horizontal native resolution is less than or equal to the value of horizontal knee point and the vertical native resolution is less than or equal to the vertical knee point.

Advantageously, by determining the native resolution of scenes included in video sequences, any visual quality degradation attributable to discrepancies between the native resolution and the display resolution may be detected. Upon detecting such a discrepancy, any number of quality assurance procedures may be implemented to ensure that the true visual qualities of scenes are correctly conveyed to users. For example, the provider may clearly specify that the video sequence include scenes that have been processed at native resolutions than are lower than the display resolution. Further, operations that are performed on the video sequences and optimized based on the resolution, such as encoding, may be fined-tuned based on the native resolution instead of the display resolution. Oftentimes, such an adjustment may dramatically decrease resource burdens, such as storage and bandwidth usage, without noticeably increasing visual quality.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for determining a native resolution of a scene within a video sequence, the method comprising:
 determining a low frequency region included in a first log-magnitude spectrum associated with the scene;
 computing an energy density ratio based on the low frequency region; and if the energy density ratio exceeds a predetermined energy density threshold, then computing the native resolution of the scene based on dimensions of the low frequency region; or if the energy density ratio does not exceed the predetermined energy density threshold, then equating the native resolution of the scene to a display resolution of the scene.

2. The method of claim 1, wherein determining the low frequency region comprises:

generating a horizontal distribution function and a vertical distribution function based on the first log-magnitude spectrum; and selecting a rectangular region included in the first log-magnitude spectrum, wherein dimensions of the rectangular region are based on the horizontal distribution function and the vertical distribution function.

3. The method of claim 2, wherein generating the horizontal distribution function comprises projecting the first log-magnitude spectrum along rows to generate a one dimensional (1D) horizontal projection and folding the 1D horizontal projection.

4. The method of claim 1, wherein determining the low frequency region comprises:

generating a horizontal distribution function and a vertical distribution function based on the first log-magnitude spectrum;

performing one or more curve-fitting operations to determine a first line that approximates the horizontal distribution function, wherein a first segment included in the first line intersects a second segment included in the first line at a horizontal knee point;

performing one or more curve-fitting operations to determine a second line that approximates the vertical distribution function, wherein a first segment included in the second line intersects a second segment included in the second line at a vertical knee point; and selecting a rectangular region included in the first log-magnitude spectrum, wherein dimensions of the rectangular region are based on a spectral frequency of the horizontal knee point and a spectral frequency of the vertical knee point.

5. The method of claim 4, wherein performing the one or more curve-fitting operations to determine the first line comprises:

setting end points of the first line equal to end points of the horizontal distribution function; and adjusting a location of the horizontal knee point to minimize an area between the first line and the horizontal distribution function.

6. The method of claim 1, further comprising:

generating a horizontal distribution function based on a second log-magnitude spectrum;

computing a first area that lies between the horizontal distribution function and a one segment line that approximates the horizontal distribution function;

computing a second area that lies between the horizontal distribution function and a two segment line that approximates the horizontal distribution function;

determining that a ratio of the first area to the second area is less than a predetermined fit factor; and setting a second native resolution equal to the display resolution of the scene.

7. The computer-implemented method of claim 1, wherein computing the energy density ratio comprises:

computing a low frequency density based on the low frequency region;

computing a high frequency density based on a high frequency region that lies between the low frequency region and a bounding box associated with the first log-magnitude spectrum; and computing a ratio of the low frequency density to the high frequency density.

8. The method of claim 7, wherein the low frequency density is based on a plurality of coefficients included in the first log-magnitude spectrum that reside within the low frequency region and do not reside at an origin of the first log-magnitude spectrum.

9. A non-transitory computer-readable storage medium including instructions that, when executed by a processor, cause the processor to perform the steps of:

generating a horizontal distribution function and a vertical distribution function based on a log-magnitude spectrum associated with a scene;

determining a low frequency region included in the log-magnitude spectrum based on the horizontal distribution function and the vertical distribution function;

computing an energy density ratio based on the low frequency region; and if the energy density ratio exceeds a predetermined energy density threshold, then computing a native resolution of the scene based on dimensions of the low frequency region; or if the energy density ratio does not exceed the predetermined energy density threshold, then equating the native resolution of the scene to a display resolution of the scene.

10. The non-transitory computer-readable storage medium of claim 9, wherein determining the low frequency region comprises selecting a rectangular region included in the log-magnitude spectrum, wherein dimensions of the rectangular region are based on the horizontal distribution function and the vertical distribution function.

11. The non-transitory computer-readable storage medium of claim 10, wherein generating the vertical distribution function comprises projecting the log-magnitude spectrum along columns to generate a one dimensional (1D) vertical projection and folding the 1D vertical projection.

12. The non-transitory computer-readable storage medium of claim 9, wherein determining the low frequency region comprises:

performing one or more curve-fitting operations to determine a first line that approximates the horizontal distribution function, wherein a first segment included in the first line intersects a second segment included in the first line at a horizontal knee point;

performing one or more curve-fitting operations to determine a second line that approximates the vertical distribution function, wherein a first segment included in the second line intersects a second segment included in the second line at a vertical knee point; and selecting a rectangular region included in the log-magnitude spectrum, wherein dimensions of the rectangular region are based on a spectral frequency of the horizontal knee point and a spectral frequency of the vertical knee point.

13. The non-transitory computer-readable storage medium of claim 12, wherein performing the one or more curve-fitting operations to determine the second line comprises:

setting end points of the second line equal to end points of the vertical distribution function; and adjusting a location of the vertical knee point to minimize an area between the second line and the vertical distribution function.

14. The non-transitory computer-readable storage medium of claim 9, wherein computing the energy density ratio comprises:
   computing a low frequency density based on the low frequency region;
   computing a high frequency density based on a high frequency region that lies between the low frequency region and a bounding box associated with the log-magnitude spectrum; and
   computing a ratio of the low frequency density to the high frequency density.

15. The non-transitory computer-implemented method of claim 14, wherein the low frequency density is based on a plurality of coefficients included in the log-magnitude spectrum that reside within the low frequency region and do not reside at an origin of the log-magnitude spectrum.

16. The non-transitory computer-implemented method of claim 14, wherein dimensions of the bounding box are equal to the display resolution of the scene.

17. A system configured to determine a native resolution of a scene within a video sequence, the system comprising:
   a memory storing a native resolution analyzer; and
   a processor coupled to the memory, wherein, when executed by the processor, the native resolution analyzer configures the processor to:
      determine a low frequency region included in a log-magnitude spectrum associated with the scene;
      determine a high frequency region that lies between the low frequency region and a bounding box associated with the first log-magnitude spectrum;
      compute an energy density ratio based on the low frequency region and the high frequency region; and
      if the energy density ratio exceeds a predetermined energy density threshold, then compute the native resolution of the scene based on dimensions of the low frequency region; or
      if the energy density ratio does not exceed the predetermined energy density threshold, then equate the native resolution of the scene to a display resolution of the scene.

18. The system of claim 17, wherein the native resolution analyzer configures the processor to determine the low frequency region by:
   generating a horizontal distribution function and a vertical distribution function based on the log-magnitude spectrum; and
   selecting a rectangular region included in the log-magnitude spectrum, wherein dimensions of the rectangular region are based on the horizontal distribution function and the vertical distribution function.

19. The system of claim 18, wherein the native resolution analyzer configures the processor to generate the horizontal distribution function by projecting the log-magnitude spectrum along rows to generate a one dimensional (1D) horizontal projection and folding the 1D horizontal projection.

20. The system of claim 17, wherein the native resolution analyzer configures the processor to compute the energy density ratio by:
   computing a low frequency density based on the low frequency region,
   computing a high frequency density based on the high frequency region, and
   computing a ratio of the low frequency density to the high frequency density.

\* \* \* \* \*